United States Patent

Siwik

[15] 3,640,554
[45] Feb. 8, 1972

[54] COUPLING FOR PLASTIC TUBE

[72] Inventor: Anthony F. Siwik, Kalamazoo, Mich.

[73] Assignee: Parker-Hannifin Corporation, Cleveland, Ohio

[22] Filed: Jan. 26, 1970

[21] Appl. No.: 5,480

[52] U.S. Cl. .............................. 285/382.2, 29/522, 285/249, 285/382.5
[51] Int. Cl. ....................................... F16l 13/14, F16l 33/20
[58] Field of Search ............ 285/249, 256, 257, 258, 247 US, 285/248 US, 245 US, 250 US, 382.2, 382.5, 382.4; 29/432, 522

[56] References Cited

UNITED STATES PATENTS

| 1,098,974 | 6/1914 | Reilly | 285/382.4 X |
| 1,947,839 | 2/1934 | Fissell | 29/432 X |
| 2,236,926 | 4/1941 | Surface | 29/432 X |
| 2,268,142 | 12/1941 | Lusher et al. | 285/258 |
| 3,287,034 | 11/1966 | Bragg | 29/522 X |
| 3,399,705 | 9/1968 | Breed et al. | 285/432 X |
| 3,442,537 | 5/1969 | Courtot et al. | 285/256 X |
| 3,493,250 | 2/1970 | Hertel | 285/249 |

Primary Examiner—Thomas F. Callaghan
Attorney—John N. Wolfram

[57] ABSTRACT

A body assembly for a coupling for plastic tube in which the body assembly comprises a body having a sleeve permanently assembled thereto by indentation of a portion of the sleeve in the wall of a bore in the body.

2 Claims, 3 Drawing Figures

PATENTED FEB 8 1972

3,640,554

INVENTOR.
ANTHONY F. SIWIK
BY
John N. Wolfram
ATTORNEY

COUPLING FOR PLASTIC TUBE

BACKGROUND OF THE INVENTION

Couplings for plastic tubing usually include a sleeve insertable within the tubing to support the same when gripping pressure is applied to the tube. Because it is difficult and costly to make the sleeve integral with the body these parts are sometimes made as separate pieces. In such case it is desirable to secure the parts together so that they may be handled as one but heretofore the methods for doing so have been unsatisfactory in that the sleeve may become easily misaligned or stripped from the body.

SUMMARY OF THE INVENTION

This invention provides a body and sleeve assembly in which the sleeve is securely and rigidly attached to the body by indentation of a portion of the sleeve into the wall of a body bore. This is accomplished by initially providing the sleeve with a transverse portion that preferably includes an axially extending rim, inserting the sleeve into the body bore and using an annular tool with a rounded end for plastically deforming the transverse portion of the sleeve so as to indent the same into the bore wall to securely lock the sleeve to the body. The method of accomplishing this indentation is also a part of this invention.

DESCRIPTION

Figure 1:
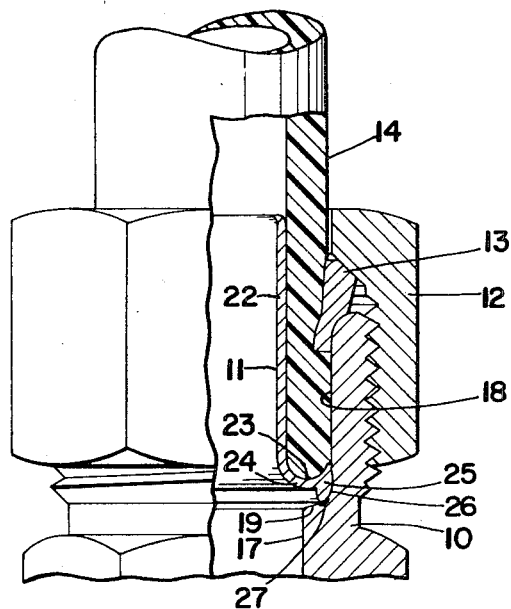
FIG. 1 is a partial section view of a completed joint of the body and sleeve assembly with a plastic tube.

As shown in FIG. 1, a completed joint utilizing the body and sleeve assembly of the present invention includes a body 10, a sleeve 11, a nut 12, a ferrule 13 and a plastic tube 14 that may be of nylon or like material.

Body 10 has a smaller diameter bore 17 and a larger diameter bore 18 that define therebetween a transverse shoulder 19. Sleeve 11 has a cylindrical portion 22 that is spaced radially inward of the wall of larger bore 18 and it has a transverse portion generally indicated as 23, said inner portion of said rim being indented into said transverse shoulder that includes a radially extending portion 24 and a rim portion 25. The latter is indented as at 26 into the wall of bore 18 and as at 27 into transverse shoulder 19.

Plastic tube 14 is held between sleeve 11 and body 10 by ferrule 13 that has been deformed by body 10 against the tube by advancement of nut 12 that is in threaded engagement with body 10.

Figure 2:
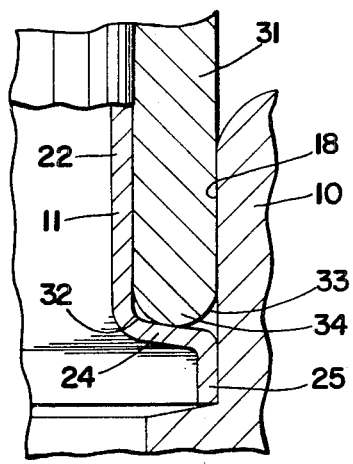
FIG. 2 is a fragmentary enlarged cross section view showing the sleeve in its initial condition within the coupling body and with a tool in position for deforming the sleeve into indenting engagement with the body.

Prior to the assembly and securing of sleeve 11 to body 10, body bore 18 is of substantially uniform diameter throughout its length, as shown in FIG. 2. Radial portion 24 of sleeve 11 is initially slightly conical, as shown in this FIGURE, and sleeve rim portion 25 extends axially inwardly of radial portion 24 and is of substantionally uniform outer diameter and a close fit within bore 18. This close fit may or may not be a slight press fit, as desired.

To secure sleeve 11 to body 10, sleeve 11 is inserted into bore 18 to the position shown in FIG. 2 and annular tool 31 that is well rounded at the radially inner and outer edges 32, 33 of its inner end 34 is telescoped over sleeve cylindrical portion 22 and brought to bear upon radial portion 24.

Figure 3:
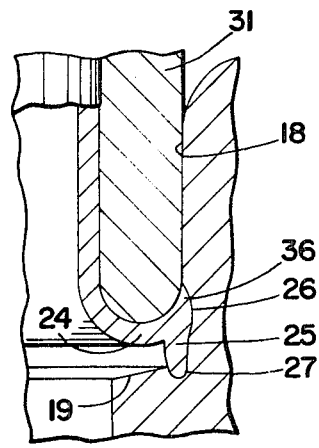
FIG. 3 is an enlarged fragmentary cross section view the same as FIG. 2 except showing the sleeve in its deformed and indented condition in which it is locked to the body.

Tool 31 is then forcibly advanced to the position shown in FIG. 3. During such advancement radial portion 24 and rim 25 of the sleeve are plastically deformed to the shape shown in FIG. 3 and during such deformation rim 25 indents itself within bore wall 18 at 26 and also in body transverse shoulder 19 at 27. Such indentation at 26 securely locks the sleeve to the body to prevent withdrawal therefrom. Also, the combined effects of indentation at 26 and 27 firmly position sleeve 11 so that it cannot be easily axially tilted relative to bore 18.

The rounded end 34 of tool 31 causes the sleeve to be plasticly deformed in a manner so that material from the sleeve rim 25 fills in the space between rounded corner 33 and bore 18 so as to create a rim portion 36 that extends axially outwardly of radial portion 24. Rounded corner 33 thus not only permits maintaining of a substantial axial length in rim 25 but also provides a powerful wedging angle for deforming the rim and for indenting it into bore 18. Such indentation is much more effective than a conventional press fit between the sleeve and body for retaining it with the body and for maintaining proper alignment between the sleeve and body. Also, the indentation within wall 18 is such that no sharp corners are formed within wall 18 that might be conductive to early failure of the body under conditions of strain or vibration.

I claim:

1. A tube coupling body assembly comprising a body having smaller and larger bores and an annular transverse shoulder therebetween, a sleeve mounted in the larger bore, said sleeve having a cylindrical portion spaced radially inward of the larger bore wall and having a transverse portion terminating in an annular rim having inner and outer portions that extend respectively in axially inner and outer directions from the transverse portion, said rim being indented into said larger bore wall in the region of said shoulder to lock the sleeve to the body, said transverse portion between the cylindrical portion and the rim being a single layer with a thickness substantially the same as the thickness of the cylindrical portion, said inner portion of said rim being indented into said transverse shoulder.

2. The assembly of claim 1 in which the transverse portion is curved between the cylindrical portion and the bore wall.

* * * * *